United States Patent Office 3,262,971
Patented July 26, 1966

3,262,971
PHOSPHORUS COMPOUNDS
Clifford N. Matthews, University City, St. Louis, Mo., assignor to Monsanto Research Corporation, St. Louis, Mo., a corporation of Delaware
No Drawing. Filed Aug. 7, 1964, Ser. No. 388,292
23 Claims. (Cl. 260—515)

This application is a continuation-in-part of my copending application S.N. 154,874, filed November 24, 1961; and a continuation-in-part of my copending application S.N. 230,266, filed October 12, 1962, both now abandoned.

This invention relates to compounds of Third Period elements and, more particularly, provides novel unsaturated compounds, including mesomeric phosphorus salts and methods of preparing the same.

A mesomeric compound or radical is one which contains a resonance (resonating) system. The carboxyl group of carboxylates is an example of a mesomeric radical. The carboxylate ion may be written as $$\overset{O}{\underset{-C-O^\ominus}{\|}}$$

but since the two oxygen atoms are equivalent and the charge resonating between them is distributed over both oxygen atoms, rather than showing the negative charge on one or the other oxygen atom, it would be more accurate to show the charge as distributed between them, thus:

As this distributed charge formula illustrates, in a mesomeric radical, the central carbon atom is surrounded by an environment of charged atoms.

Phosphorus resembles oxygen in various respects. This element, like oxygen, can be either singly or doubly bonded to a carbon atom. As an onium group, while covalently bonded to carbon, it can carry an electrical charge and form ionic salts. The onium radical, however, in contrast to oxygen in the carboxylate ion, carries a positive charge. Thus, substitution of such an onium-forming element for oxygen in formula of the carboxyl radical, in a valence state adapted to form onium groups, would produce a cationic analog of the carboxyl radical. This would be a mesomeric salt of the formula

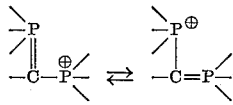

or, otherwise written,

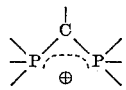

Such mesomeric salts have not previously been known. While phosphonium cationic salts are well known in the art, mesomeric cationic analogs of carboxyl compounds have nevertheless remained unknown.

It is an object of this invention to provide novel mesomeric cationic analogs of carboxyl compounds.

A particular object of this invention is to provide novel mesomeric cationic salts of phosphorus.

Another object is to provide novel methods of making such novel mesomeric salts.

Still another object is to provide novel cationic mesomeric phosphorus inner salts.

Still another object is to provide novel doubly unsaturated compounds of phosphorus and methods of making the same.

A further object is to provide a novel method of making precursors of the said salts.

These and other objects will become evident from a consideration of the following specification and claims.

The novel mesomeric salts provided by this invention are salts wherein the cation is a monovalent mesomeric system comprising a methylidyne radical linking two phosphorus atoms, including inner salts with the stated cationic structure and thus designated mesomeric inner salts.

Novel and unexpectedly effective methods are provided by this invention for producing the presently provided novel salts, which may be effected by methods comprising treating a methylene bis phosphonium salt with a base.

The effect of alkali treatment on phosphonium salts was investigated in the early history of phosphorus chemistry, a century ago. It was found that the phosphonium salts were cleaved by alkali, so as to lose an organic radical and form a phosphine oxide, as illustrated by the equation:

$$(CH_3)_4P^\oplus Br^\ominus \xrightarrow{NaOH} (CH_3)_3PO$$

In the 20th century, Wittig showed that organolithium compounds, which have a basic character, could be used to remove an organic radical from a phosphonium salt and form a phosphorane ylide (or, as it may be called, an "ylene"), as illustrated by the equation:

$$CH_3\phi_3P^\oplus Br^\ominus \xrightarrow{\phi Li} \phi_3P=CH_2 \quad (\phi=\text{phenyl})$$

Extensions of this work have demonstrated that other bases can be used to form ylides ("ylenes") also, including sodamide, alkali metal alkoxides and, where an organic phosphorus substituent is acyl or carbalkoxy substituted, even an alkali metal hydroxide like NaOH.

Bis-phosphonium salts have been investigated in the latter connection, with the result that the bis-ylides $$(C_6H_5)_3P=CH(CH_2)_xCH=P(C_6H_5)_3$$

where $x$ is 2 or 4 were successfully produced using basic reagents such as phenyl or butyllithium, sodamide and sodium ethoxide (Angew. Chemie, 71, 261). However, the ethylene bis-phosphonium salts behave otherwise: instead of the expected [—CH=P(C₆H₅)₃]₂ product, one of the phosphorus atoms separates from the alkylene organic radical to form a phosphine, the reaction apparently proceeding as shown in the following equation:

$$\overset{\ominus}{Br}\phi_3\overset{\oplus}{P}-CH_2CH_2-\overset{\oplus}{P}\phi_3\overset{\ominus}{Br} \xrightarrow{\phi Li} \phi_3P + CH_2=CH-\overset{\oplus}{P}\phi_3\overset{\ominus}{Br}$$

Treating ethylenebisphosphonium salts with sodium alkoxides was also found to produce loss of an organic radical to form a phosphine, thus

[—CH₂P⊕(CH₂CH₂CN)(CH₃)₂Br⊖]₂→
P(CH₂CH₂CN)(CH₃)₂ or a diphosphine

[—CH₂P⊕(CH₂CH₂CN)₃Br⊖]₂→
[—CH₂P(CH₂CH₂CN)₂]₂

Thus, the ethylene bisphonium salts were shown to tend to lose an organic radical, rather than losing the elements of a hydrogen halide as do the bisphosphonium salts where the alkylene group is trimethylene or longer chain length.

Surprisingly, the methylene bisphosphonium salts do not undergo the cleavage of a P-C bond which the ethylene salts exhibit. On the other hand, they do not resemble the higher alkylene salts in eliminating the anion and an alpha-carbon substituent at each phosphonium group.

Instead, the methylene bis(onium) salts eliminate an anion and an alpha-carbon atom substituent from one phosphonium group only, to form a mesomeric salt of the above-stated novel type.

The stated mesomeric salts in turn will react with a strong base to eliminate the anion and the methylidyne carbon atom substituent, to form a carbodiphosphorane, an allene analog wherein a single carbon atom links two phosphorus atoms each having three additional substituents.

These allene-type compounds can be regarded as analogs of carbon dioxide, in parallel to the analogy of the presently provided mesomeric salts to carboxylate radicals. Such allene analogs are also provided as new compounds by this invention.

The invention as set forth in the foregoing description will be more readily understood from a consideration of the following equations, illustrating a particular embodiment of this invention:

(I) 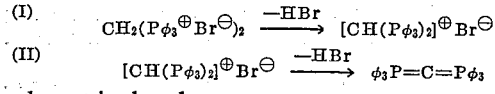

(II) 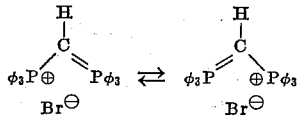

where $\phi$ is phenyl.

The product of Equation I is a salt comprising the mesomeric cation of this invention. It may be written to show the resonating system, as

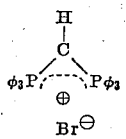

or it may be written to show the equivalence of the two P atoms, as

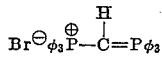

or it may be written as a single resonance form, as

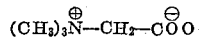

The presently provided inner salts are also salts having a mesomeric cation as provided by this invention.

Inner salts are compounds having a positive charge localized in one portion of the molecule and a negative charge localized in another portion of the same covalently bonded molecule. Familiar examples of such salts are the betaines (zwitterions) such as $$(CH_3)_3\overset{\oplus}{N}-CH_2-C\overset{\ominus}{O}O$$

in which the positively charged cationic group is a substituted ammonium radical. The presently provided novel inner salts are compounds wherein the positively charged group comprising the cation of the inner salt is a trisubstituted phosphonium methylene trisubstituted phosphorane group.

As noted above, dehydrohalogenation of a methylene bis(phosphonium halide) such as methylene bis(triphenylphosphonium bromide) with a base such as lithium butyl produces (phosphoranylidene methyl) posphonium salts and carbodiphosphoranes:

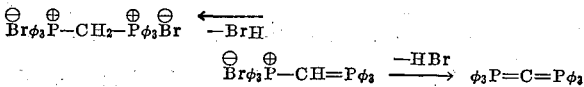

where $\phi$ is phenyl.

When this reaction utilizing lithium butyl is conducted in the presence of a Lewis acid such as $B\phi_3$, it is found that the product isolated is an ionizable salt, in which the anion can be displaced by metathesis:

(These types of salts, in which the negative charge is not located in the same covalently bonded molecule as that in which the positive charge is located, may be called "outer salts," to distinguish them from inner salts.)

However, when the carbodiphosphorane is reacted with the Lewis acid, it is now found that the product is the inner salt,

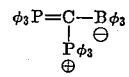

Further, it has been found that a carbodiphosphorane can be added to unsaturated carbon compounds wherein a doubly bonded carbon atom is disubstituted by electronegative substituents capable of forming a double bond with carbon, as represented, for example, by the reaction

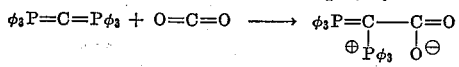

The invention thus provides methods of producing a variety of inner salts with different anions wherein the mesomeric cation is a trisubstituted phosphonium methylene trisubstituted phosphorane group.

The presently provided novel salts are useful for a wide variety of chemical and agricultural purposes.

For example, they may be employed in analytical chemistry, as for forming identifiable salts with particular anions. The mesomeric "outer salts" (the salts which are not inner salts) undergo metathesis readily, to form salts with anions other than the original anion. Thus, for example, the bromide ion of the above-shown mesomeric phosphorus bromide salt can be replaced by a tetraphenylboronate ion.

Members of the class of novel salts provided by this invention, including the inner salts, have photochromic (phototropic) properties adapting them for use as light indicators. For example, the stated tetraphenylboronate salt undergoes a distinct color change on exposure to light. Exposure to ultraviolet light produces a distinct color change in the inner salts. Thus, these compounds can be used as indicators of light exposure, employed, for example, on photographic film packs, whereby undesired exposure of the film to light can be detected. Moreover, the stated photochromic reaction is associated with formation of free radicals. Thus these products can be used as a light-activatable source of free radicals.

The class of mesomeric salts of this invention also has important utility as a chemical intermediate. The "outer" salts release the elements of an acid to form a compound of the type

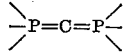

as, for example, in the embodiment

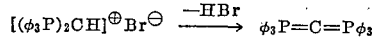

The resulting class of allene analogs also provided as new compounds hereby are in turn intermediates for various purposes. For example, this type of compound may be used in the Wittig reaction to convert oxo compounds to olefins such as allenes. The mesomeric monovalent cations provided by the present invention can also be the external cations surrounding a divalent anion, for example a planar anion such as carbonate. This type of compound, as has been recognized in the art, has unusual properties as a result of its close packing adapting it for many useful purposes, such as catalysts of processes such as addition polymerization of unsaturated monomers, combustion of fuels and oils, and so forth, and also including use as free radical sources, as reducing agents, and the like.

Further, the mesomeric outer salts of this invention can also be employed in the preparation of inner salts, by way of addition of $CS_2$, $CO_2$, COS, boron triphenyl or the like to a

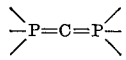

intermediate as above indicated. Where such inner salts have a structure adapting them for employment in the construction of polymeric molecules, they will form a molecule which has its internal cohesion substantially increased by the presence of the ionic charges thereon, and unusual electrical properties.

Moreover, the novel products of the present invention may be employed for industrial and agricultural purposes such as use as semiconductors and photoconductors, wetting agents, rubber antidegradation agents, insecticides, fungicides, herbicides, nematocides, bactericides, defoliants, and so forth.

DESCRIPTION OF PRODUCTS

(1) Mesomeric salts

Referring now to the nature of the salts provided by the present invention, broadly speaking, they are salts wherein the cation is a monovalent mesomeric system comprising a methylidyne radical linking phosphorus atoms each linked to three substituents in addition to the stated methylidyne radical.

There is no present nomeclature satisfactorily adapted for naming the stated compounds. Compounds containing a P=C bond are phosphoranes, and compounds containing the

configuration are phosphonium salts, while in the present mesomeric salts, the nature of the bond between P and C is a hybrid of the phosphorane and phosphonium type, since it resonates between the two. Thus while the classical phosphonium radical is $(R_4P)^{\oplus}$, the non-classical radicals of the novel salts provided hereby must be represented as $(R_4P)^{\frac{1}{2}\oplus}$, since it requires two of them to combine with one singly charged anion.

The presently provided salts can be named according to accepted nomenclature principles, on the assumption that they possess a single resonance structure. Thus the salt

or

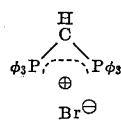

can be designated triphenyl[(triphenylphosphoranylidene)methyl]phosphonium bromide, without great inaccuracy. However, the non-symmetrical mesomeric salt

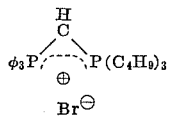

can be designated either tributyl[(triphenylphosphoranylidene)methyl]phosphonium bromide or [(tributylphosphoranylidene)methyl]triphenyl phosphonium bromide, whereas the compound is a hybrid of the two:

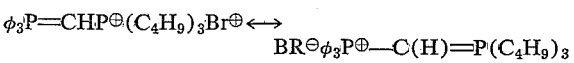

To acknowledge this ambiguity resulting from the mesomeric nature of the group consisting of the methylidyne radical and the two trisubstituted phosphorus atoms linked to it, and to indicate their hybrid character, the present mesomeric salts are sometimes designated hereinafter as bis "phosphoranium" compounds, where the phosphoranium group is represented by

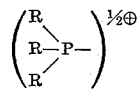

where each R is a substituent. Thus the salt

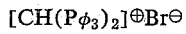

or

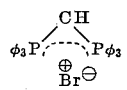

is named methylidyne bis(triphenylphosphoranium)bromide.

Referring now to the scope of this invention, the class of mesomeric salts of which illustrative species are hereby provided comprises as the mesomeric cation a (phosphoranylidene methyl)phosphonium radical, of the formula

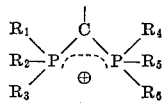

where each R (each of $R_1$, $R_2$ and so forth through $R_6$) is a hydrocarbon radical, and more particularly, hydrocarbon free of non-benzenoid unsaturation and containing up to 18 carbon atoms. Preferably, each R is aromatic, containing a phenyl or fused ring aromatic system.

For brevity, the stated cation is represented hereinafter in some places by the formula

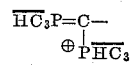

or

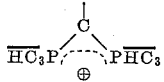

wherein $\overline{HC_3}$ is used to designate attachment of three hydrocarbon radicals, as each represented by the R substituents above, to each P atom.

A. Outer salts

The presently provided "outer salts," which are the present salts capable of metathesis, are salts of the formula

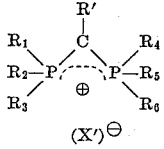

where each R ($R_1$, $R_2$, $R_3$ and so forth) is hydrocarbon as defined above; R' is selected from the class consisting of H and R; and X' is an anion.

Broadly, X' may be an anion, organic or inorganic. The method hereby provided for preparing the stated compounds produces halide salts readily, and the halides are a preferred inorganic anion. Other salts can readily be prepared from the halides by metathesis. Illustrative of other inorganic anions which can be combined with the mesomeric cation-forming salts in the scope of this invention are oxyanions such as sulfate, bisulfate, nitrate, bromate, phosphate, perchlorate, permanganate, and the like; complex halo-anions such as chlorostannate(IV), chloroantimonate(V), chloroaluminate, chlorophosphate, fluoborate, chloroferrate, and the like; and so forth. The anions of the presently provided novel salts also include organic anions, of a variety of types. Thus, for example, the novel salts of this invention include carboxylates comprising aliphatic and aromatic, mono- and polybasic, wherein the organic radical is hydrocarbon or hydrocarbon substituted by various radicals, such as chloroacetate, benzoate, glutarate, and the like. The organic anions are not limited to carboxylates, but may include such other types as the anions of toluenesulfonic acid, phenylphosphonic acid, benzeneboronic acid, phenol, 2,4,6-triphenylphenol, and so forth. They may also include salts of non-oxy organic anions such as the tetraphenylboronate ion, triphenylmethane (trityl), and so forth. Anions tending to form free radicals readily, such as iodide, trityl, tetraphenylboron, 2,4,6-triphenylphenoxy, dye systems forming organometallic compounds with alkali metals and the like are especially preferred.

Of the outer, mesomeric salts provided by this invention, illustrative of those comprising aliphatic radicals in the cation are, for example:

$(CH[P(CH_3)_3]_2)^\oplus Br^\ominus$, methylidyne bis(trimethylphosphoranium) bromide, or

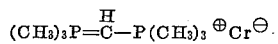

trimethyl [(trimethylphosphoranylidene) methyl] phosphonium bromide).

$(CH_3C[P(C_2H_5)_3]_2)^\oplus PCl_6^\ominus$, ethylidyne bis(triethylphosphoranium) chlorophosphate, or

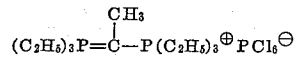

triethyl[1 - (triethylphosphoranlidene)ethyl]phosphonium chlorophosphate).

$(CH[P(C_3H_7)_3]_2)^\oplus I^\ominus$, methylidyne bis(tripropylphosphoranium) iodide, or

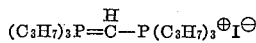

tripropyl [(tripropylphosphoranylidene) methyl] phosphonium iodide).

$(C_8H_{17}C[P(C_4H_9-n)_3]_2)^\oplus CH_3COO^\ominus$, nonylidyne bis(tributylphosphoranium) acetate, or

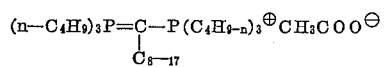

tri-n-butyl[1 - (tri-n-butylphosphoranylidene)nonyl]phosphonium acetate).

$(CH[P(C_4H_9)_3]_2)^\oplus B(C_6H_5)_4^\ominus$, methylidyne bis(tributylphosphoranium) tetraphenylboronate, or

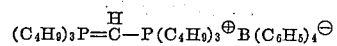

tributyl [(tributylphosphoranylidene) methyl] phosphonium tetraphenylboronate).

$(C_2H_5C[P(C_4H_9-i)_3]_2)^\oplus Br^\ominus$, propylidynebis(tributylphosphoranium) bromide, or

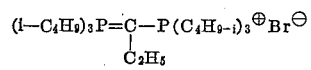

triisobutyl [1 - (triisobutylphosphoranylidene) propyl] phosphonium bromide.

$(CH[P(C_8H_{17})_3]_2)^\oplus C(C_6H_5)_3^\ominus$, methylidynebis(trioctylphosphoranium) tritylate, or

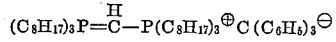

trioctyl[(trioctylphosphoranylidene)methyl]phosphonium tritylate).

$(CH[P(C_6H_{11})_3]_2)^\oplus Br^\ominus$, methylidynebis(tricyclohexylphosphoranium) bromide, or

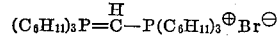

tricyclohexyl [(tricyclohexylphosphoranylidene) methyl] phosphonium bromide).

$(CH[P(C_4H_9)_2CH_3]_2)^\oplus I^\ominus$, methylidynebis (dibutylmethylphosphoranium) iodide, or

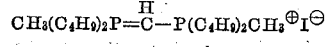

dibutyl [(dibutylmethylphosphoranylidene) methyl]methylphosphonium iodide).

$(CH[P(C_4H_9)_3][P(C_3H_7)_3])^\oplus Br^\ominus$, methylidyne (tributylphosphoranium)(tripropylphosphoranium) bromide, or

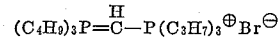

[(tributylphosphoranylidene)methyl] tripropylphosphonium bromide, or

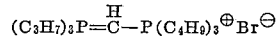

tributyl [(tripropylphosphoranylidene)methyl] phosphonium bromide).

Illustrative of the aryl-substituted compounds of the invention, which are preferred, are $(CH[P(C_6H_5)_3]_2)^\oplus Br^\ominus$
$(CH[P(C_6H_4CH_3)_3]_2)^\oplus B(C_6H_5)_4^\ominus$
$(C_6H_5C[P(C_6H_5)_3]_2^\oplus C_6H_5COO^\ominus$
$(CH_3C[P(C_6H_5)_3]_2)^\oplus Br^\ominus$
$(CH[P(CH_2C_6H_5)_3]_2)^\oplus CH_3COO^\ominus$
$(CH[P(C_{10}H_7)_3]_2)^\oplus PCl_6^\ominus$
$(CH[P(C_6H_4-C_6H_5-p)_3]_2)^\oplus (C_6H_5)_3C^\ominus$
$(CH[P(C_2H_5)(C_6H_5)_2]_2)^\oplus I^\ominus$
$(CH[P(C_6H_5)_3][P(C_2H_5)_3])^\oplus (C_6H_5)_3C_6H_2O^\ominus$
$(CH_3C_6H_4C[P(C_6H_5)_3]_2)^\oplus MnO_4^\ominus$
$(C_{10}H_7C[P(C_{10}H_7)_3]_2)^\oplus B(C_6H_5)_4^\ominus$ and so forth.

B. Inner salts

The novel class of inner salts provided by this invention are generally represented by the formula

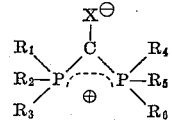

where each R (each of $R_1$, $R_2$, $R_3$, and so forth) is a hydrocarbon radical as defined above, and X is a radical satisfying the residual valence of the carbon atom to which it is attached and negatively charged, providing the internal compensation for the cationic phosphonium charge in the molecule. The present compounds thus comprise an anionic group as the substituent satisfying the residual valence of the mesomeric cationic carbon atom in the above-described cation, said anionic group being a negatively charged radical. The stated anionic group will generally consist of elements of up to the third Period of the Periodic Table. Particularly contemplated herein are anionic groups wherein the element joining the group to the molecule is an element of Groups III and IV of the Periodic Table. In general, the stated groups will be selected from a trisubstituted Group III element and a disubstituted Group IV element. Preferably, the stated groups will be selected from a Group III element trisubstituted by monovalent substituents and carbon disubstituted by electronegative substituents capable of forming a double bond with carbon. Thus, representative of the stated anionic groups are the formulas

and

where M is a Group III element such as B, each R' (that is, each of $R_1'$, $R_2'$, and $R_3'$) is a substituent, and Y and Z are each electronegative substituents capable of doubly bonding with carbon. The presently provided novel products containing Group III elements are conveniently derived from the organometallic compounds containing three hydrocarbon substituents, as will appear hereinafter, providing anionic groups of the above formula wherein each R' is a hydrocarbon radical, and more particularly, hydrocarbon free of non-benzenoid unsaturation and containing up to 12 carbon atoms. Preferably, each R' is aromatic, containing a phenyl or a fused aromatic ring system. The carbonaceous anionic groups in the inner salts of this invention, as set forth in further detail below, are available from compounds of doubly bonded carbon disubstituted by electronegative elements capable of doubly bonding with carbon, such as allenic carbon compounds, and, more particularly, allenic compounds of carbon with Period 2 and 3 chalcogen elements. Thus, compounds of the above formula are provided wherein each of Y and Z is a chalcogen element.

Particularly preferred, unique inner salts provided by this invention are those wherein a direct bond joins the anionic group and the cation. The salts comprising a mesomeric disubstituted anionic group are dimesomeric inner salts in which the central carbon atoms are each participants in a resonance system, of the formula

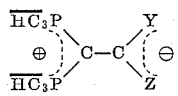

where the P substituents are hydrocarbon radicals as defined above, and Y and Z are electronegative substituents capable of forming a double bond with carbon. The salts comprising a Group III element provide inner salts in which the central carbon atom is surrounded by an environment of charged hetero (other than carbon or hydrogen) atoms, of the formula

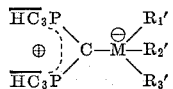

where the P substituents are hydrocarbon radicals as defined above and each R' (each of $R_1'$, $R_2'$, and $R_3'$) is an anionic group substituent as defined above.

The class of inner salts provided hereby is exemplified by the compounds listed below. The nomenclature employed herein uses the shorter form in which the acid and onium group are named as substituents, omitting reference to the hydroxide of which the inner salt is a formal derivative: thus

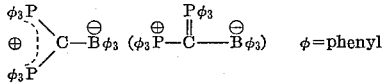   $\phi$ = phenyl is triphenylphosphonium (triphenylboronyl) methylenetriphenylphosphorane,

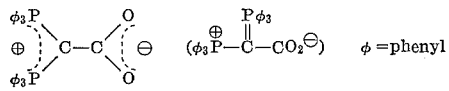   $\phi$ = phenyl is triphenylphosphonium (carboxy) methylenetriphenylphosphorane, and so forth.

Exemplifying the inner salts of this invention are

Triphenylphosphonium (triphenylboronyl) methylenetriphenylphosphorane,
Triphenylphosphonium (trinaphthylboronyl) methylenetriphenylphosphorane,
Triphenylphosphonium (tri-m-tolylboronyl) methylenetriphenylphosphorane,
Triphenylphosphonium (triisopropylaluminyl) methylenetriphenylphosphorane,
Triphenylphosphonium (triphenylaluminyl) methylenetriphenylphosphorane,
Tributylphosphonium (triphenylboronyl) methylenetriphenylphosphorane,
Tributylphosphonium (triphenylboronyl) methylenetributylphosphorane,
Triphenethylphosphonium (triphenylboronyl) methylenetriphenethylphosphorane,
Triphenylphosphonium (tri-t-butylboronyl) methylenetriphenethylphosphorane,
Triphenylphosphonium (carboxy) methylenetriphenylphosphorane,
Triphenylphosphonium (thiocarboxy) methylenetriphenylphosphorane,
Triphenylphosphonium (dithiocarboxy) methylenetriphenylphosphorane,
Tri-p-biphenylphosphonium (carboxy) methylenetri-p-biphenylphosphorane,
Tricyclohexylphosphonium (carboxy) methylenetricyclohexylphosphorane,
Triphenanthrylphosphonium (carboxy) methylenetriphenanthrylphosphorane, and so forth.

(2) *Carbodiphosphoranes*

The class of unsaturated allene analogs, designated carbodiphosphoranes, provided by this invention are compounds wherein a single, unsubstituted carbon atom links two phosphorus atoms, each having three substituents in addition to the linking carbon atom.

More particularly, this invention provides such compounds of the formula

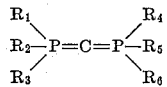

where each R is as defined above, in reference to the presently provided mesomeric salts. That is, each R ($R_1$, $R_2$, and so forth) is hydrocarbon free of non-benzenoid unsaturation and containing from 1 to 18 carbon atoms.

Illustrative of these allene analogs are the following

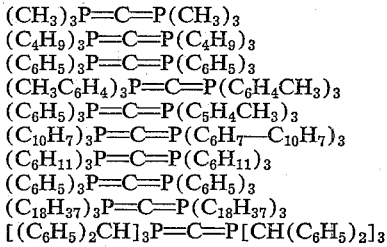

and so forth.

The aryl-substituted carbodiphosphoranes are an especially preferred embodiment of this aspect of the invention.

METHODS OF PREPARATION (1) *Mesomeric outer salts and carbodiphosphoranes*

The presently provided novel mesomeric outer salts are prepared in accordance with this invention by treating a methylene bisphosphonium salt with a base. The methylene bisphosphonium salts useful in this connection are salts wherein a substituent of the methylene carbon atom and an anion can combine to provide a volatile inorganic compound. Methylene bisphosphonium halides are preferred in this connection; such phosphonium salts, when the methylene group carries an H substituent, eliminate the elements of a hydrogen halide. A halomethylene bisphosphonium halide can eliminate a halogen substitutent and a halogen anion to provide the atoms which are the elements of a halogen molecule. Phosphonium hydroxides are readily available by means known in the art, such as treatment of a phosphonium halide with silver oxide, and water can be eliminated by loss of H from a methylene carbon atom and of the OH anion, and so forth.

Exemplary of presently useful bisphosphonium salts are phosphonium salts such as

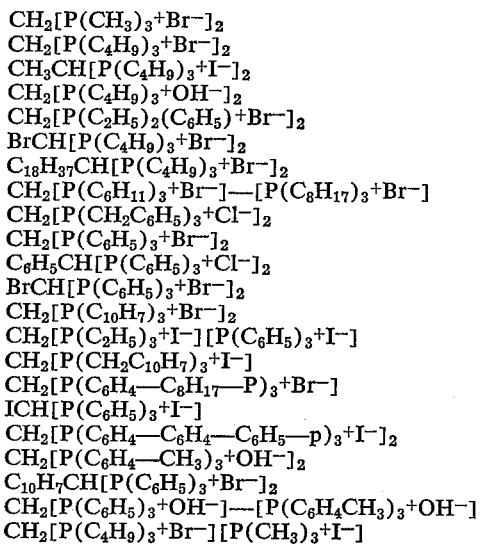

and so forth.

It is to be appreciated that the presently provided method is not limited to methylene bisphosphonium compounds as listed above. A variety of methylene bisphosphonium halides and hydroxides having at least one methylene substituent selected from the group consisting of H and halogen, wherein the phosphorus atoms have as substituents organic radicals free of interfering substituents, may be subjected to the method of this invention to produce mesomeric salts and carbodiphosphoranes.

Methods of preparing methylene bisphosphonium compounds are well known in the art, and the stated phosphonium compounds may be prepared by such methods including, for example, the reaction of a phosphine with a methylene dihalide.

Referring now to the conversion of methylene bisphosphonium compounds to the novel mesomeric outer salts of this invention, the method hereby provided for effecting this conversion consists in contacting the phosphonium compound with a base.

Any of a wide variety of bases may be used. The base may be a classic base, such as sodium carbonate or the like. Thus, for example, sodium hydroxide, potassium bicarbonate, magnesium hydroxide, lime, aluminum hydroxide, and like simple inorganic bases may be used. Other useful inorganic bases include, for example, hydrides such as sodium hydride.

It may be a Brønsted base, which is any substance acting as a proton acceptor. In this connection, strong bases effective for conducting the method of this invention include organolithium compounds such as butyl lithium, phenyl lithium, ethyl lithium, and so forth, and other alkali metal organometallics such as naphthyl sodium, trityl sodium, benzyl potassium, and the like.

The base employed may also, it has been found, be nitrogenous. Exemplary of nitrogenous bases are the amines, including ammonia, organic amines such as piperidine and triethylamine, and quaternary ammonium compounds such as allyltrimethylammonium hydroxide, benzyltributylammonium bromide, and so forth. It has been found that the desired dehydrohalogenation can be effected with an amide, and more particularly, with dimethylformamide.

Other bases which may be employed include, for example, alkali metal alkoxides such as sodium methylate, potassium butylate, lithium isopropylate, and so forth, as well as other alkoxides such as titanium tetraisopropoxide, aluminum triisopropoxide, and so forth.

The amount of base to be employed in treating the methylene bisphosphonium compound to produce one of the presently provided mesomeric salts therefrom may vary. In general, at least one mole of base per mole of the methylene bisphosphonium compound will be employed, although excess phosphonium compound may be used where decreased conversion to the mesomeric salt is allowable.

As noted above, the novel mesomeric outer salts of this invention react with a base to form the novel carbodiphosphoranes provided by this invention. Therefore, when an excess of base is employed to treat a methylene bisphosphonium dihalide or hydroxide precursor of the mesomeric outer salts, formation of the carbodiphosphorane compounds may occur, particularly when the base is metallic, such as lithiumbutyl. This may be turned to advantage, to prepare the carbodiphosphoranes in one step from the methylene bisphosphonium precursor by treatment thereof with 2 moles or more of a strong metallic base. Alternatively, the mesomeric outer salt may be prepared by treating the methylene bisphosphonium salt with an aqueous base system, such as aqueous sodium carbonate, which can be employed in large excess if desired since the carbodiphosphorane is not formed in an aqueous system; or else the mesomeric salts may be prepared by treating the methylene bisphosphonium salt with a metallic base in the absence of water, with losses of mesomeric salt to carbodiphosphorane due to excess base being tolerated. Formation of the carbodiphosphorane is slower than formation of the mesomeric salt, and they are readily separated due to their different aqueous and organic solubilities, so that the latter method is not unduly disadvantageous. Thus, this invention contemplates use of excess base, in an amount greater than one mole per mole of methylene bisphosphonium salt, in preparation of the mesomeric outer salts, including 2 moles per mole of bisphosphonium salt, and ranging up to, say, about 20 times as much base as phosphonium compound.

When the mesomeric outer salt is to be converted to the carbodiphosphorane, it will be contacted with a base in a non-aqueous system. Preferably, the base will be metallic, including hydrides such as sodium hydride, organometallics such as phenyllithium, butyllithium, and the like. The mesomeric salt will be one containing a labile substituent on the methylidyne carbon atom, with an anion selected from halogen and hydroxide, so that it can eliminate the elements of a volatile inorganic compound, such as HOH, HX or X$_2$, where X is halogen. At least one mole of base per mole of mesomeric outer salt will be employed where complete conversion to the carbodiphosphorane is desired, and excess base up to 20 moles per mole of mesomeric salt may desirably be used. As noted above, a one-step method for formation of the carbodiphosphorane can be conducted by treating the methylene bisphosphonium precursor of the mesomeric outer salt with excess metallic base in a non-aqueous system.

The present invention includes the provision of mesomeric outer salts of the presently provided novel kind which are not limited to those available by direct synthesis. Thus, metathesis may be employed to convert a mesomeric salt halide, for example, to a different salt such as the tetraphenylboronate. This conversion may be affected by methods usual in the art, such as contacting the mesomeric salt with a salt having the anion it is desired to introduce, in a mutual solvent such as water. Alternatively, the anion may be provided in the reaction mixture in which the mesomeric salt is formed: for example, triphenyl boron may be contacted with lithiumbutyl, forming the butyltriphenylboronate ion, in a reaction mixture in which lithiumbutyl is employed as a base to convert a methylene bisphosphonium dihalide to a methylidyne bisphosphoranium halide. In such case, products which can be isolated include the salt of the mesomeric, methylidyne bisphosphoranium cation with the introduced anion, such as butyltriphenylboronate.

In carrying out the methods of the present invention to provide mesomeric outer salts and carbodiphosphoranes, the reactants are simply contacted until the reaction is complete. It may be advantageous to employ a solvent or diluent in the reaction mixture. Suitable inert solvents and diluents in this connection include hydrocarbons such as benzene or hexane, oxygenated solvents free of active hydrogen such as dioxane, ether, tetrahydrofuran, diglyme (dimethyl ether of diethylene glycol), and the like, and high-melting solvents which melt between 50° and 100° C., such as phosphate esters, including, for example, a molten phosphate ester such as tricresyl or triphenyl phosphate. Aqueous systems may be employed to form the novel salt products of this invention, both in metathesis and in treatment of a phosphonium salt to form a phosphoranium salt.

To accelerate the rate of reaction when desired, heating may be employed. Temperatures used may vary from down to where the reaction mixture is barely liquid to up to below decomposition temperatures of the reaction mixture components. The rapidity of the reaction will vary with the reactants chosen and, in some cases, the reaction may be exothermic and require cooling and/or diluents to moderate its violence while other pairs of reactants may not react completely until after refluxing at elevated temperatures. Suitable temperatures for carrying out the reactions comprise, for example, the reflux temperatures of the reaction mixtures. Pressure variation may also be utilized to facilitate the conduct of the reaction, for example, by carrying out the reaction in a pressure-resistant vessel under autogenous pressure and elevated temperatures. The time required to accomplish the reaction depends on functional factors such as the reactivity of the reactants, the temperature of reaction, etc. Reaction rates and times of reactions may vary considerably also depending on the details of apparatus and other operational conditions. By suitable arrangements, continuous procedures may be substituted for the batch-type operation as described below.

On completion of the reaction, the product thereof may be separated by conventional methods such as precipitation, vaporization, distillation, extraction, and the like.

(2) Mesomeric inner salts

The presently provided novel mesomeric inner salts are prepared in accordance with this invention by combining a carbodiphosphorane with an ionizable anionic group precursor. In the case of the inner salts of this invention which are Group III element derivatives, the stated precursor is a Lewis acid which is a trihydrocarbyl Group III element of the formula

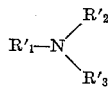

and the reaction taking place is an addition of the one to the other, as represented by the following equation:

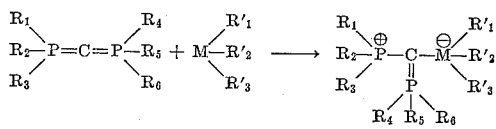

where M is a Group III element and each R and R' are substituents as defined hereinabove.

Preparation of the dimesomeric inner salts of this invention is effected by addition of a carbodiphosphorane to an unsaturated carbon compound wherein a doubly bonded carbon atom is disubstituted by electronegative substituents each capable of forming a double bond with carbon. The stated carbon compounds can, in accordance with this invention, be allenes, represented by the formula $Y=C=Z$, and the reaction taking place, providing two directly attached mesomeric radicals, is represented by the equation:

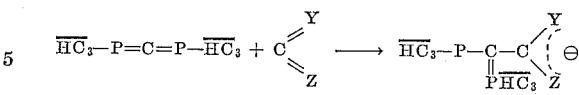

where Y and Z are electronegative substituents capable of doubly bonding with carbon, such as the chalcogen elements O and S.

The carbodiphosphoranes useful in this connection are available, for example, by treatment of a methylene bisphosphonium salt with a base, such as treatment of a methylene bis(triphenylphosphonium bromide) with a base such as a hydride like sodium hydride, as described hereinabove. The stated carbodiphosphoranes will be of the formula

where each R is as defined above.

Illustrative of useful carbodiphosphoranes are: carbobis(trimethylphosphorane), carbobis(trimethylphosphorane), carbobis(tributylphosphorane), carbobis(tribenzylphosphorane), carbobis(triphenylphosphorane), carbobis(trinaphthylphosphorane), carbobis(triamylphosphorane), carbobis(triisohexylphosphorane), carbo(triphenylphosphorane)(tritolylphosphorane), carbobis(tricyclohexylphosphorane), and the like.

The trisubstituted Group III element anion precursors in accordance with the invention can be trihydrocarbyl boranes and aluminum organometallic compounds, such as triphenylborane, tri-m-tolylborane, trimethylborane, trinaphthylborane, triphenylaluminum, diethylbutylaluminum, diphenyl-p-tolylborane, triethylaluminum, triisopropylaluminum, 1-naphthyldiphenylborane, tri-p-biphenylborane, triisobutylaluminum, and so forth.

The unsaturated carbon compounds which may be employed to make the dimesomeric inner salts provided hereby include the carbon dichalcogenides, that is, carbon dioxide, carbon disulfide and carbon oxysulfide.

For the preparation of the presently provided novel inner salts, the carbodiphosphorane will be contacted with the selected anionic group precursor, until addition of the precursor to the carbodiphosphorane has occurred. Suitably, the reactants will be contacted in about a 1:1 molar ratio, although up to a 2:1 or greater molar ratio of one to the other may be employed if desired. Ordinarily the reaction is best conducted under anhydrous conditions, and in organic solvents. Suitable organic inert solvents and diluents in this connection are high boiling oxygenated solvents free of active hydrogen such as diglyme (dimethyl ether of diethylene glycol), dioxane, diethyl ether, tetrahydrofuran, and the like; or hydrocarbons such as benzene or hexane. The reactions may also be carried out in the absence of solvents.

Heating may be employed in conducting the reaction. Temperatures used may vary from down to where the reaction mixture is barely liquid up to any temperature below decomposition temperature of the mixture components. The rapidity of the reaction will vary with the reactants chosen. In some cases, the reaction may be exothermic and require cooling, diluents or the like to moderate its violence. Other pairs of reactants may not react completely until after refluxing at elevated temperatures. Suitable temperatures for carrying out the reaction comprise, for example, the reflux temperatures of the reaction mixtures. Pressure variation may also be utilized to facilitate conduct of the reaction, for example, by carrying out the reaction in a pressure-resistant vessel under autogenous pressure and at elevated temperatures. The time required to accomplish the reaction depends on functional factors such as reactivity of the reactants, the temperature of reaction, and so forth. Batch or continuous methods may be used, and on completion of the reaction, the products may be separated by conventional methods such as precipitation, evaporation, distillation, extraction, and the like.

The following examples illustrate, but do not limit, the invention.

EXAMPLE 1

This example illustrates preparation of a mesomeric outer salt and a carbodiphosphorane.

A mixture of 262 grams (g.) of triphenylphosphine and 200 g. methylene dibromide is refluxed (99° C.) with stirring under nitrogen for 1 hour. Addition of ether to the cooled reaction mixture produces separation of a solid which is separated, and dissolved in 400 milliliters (ml.) methanol. Addition of dry ether and cooling produces a precipitate which is filtered off, dissolved in 250 ml. hot methanol, treated with charcoal, and the solution filtered hot. Cooling forms a precipitate which is filtered off and washed with cold methanol. The product is methylenebis-(triphenylphosphonium bromide).

Calc.: 63.7% C; 4.6% H; 8.9% P; 22.9% ionic Br. Found: 63.12% C; 5.80% H; 8.93% P; 22.25% total Br; 22.16% ionic Br.

A 44 g. quantity (about 0.06 mole) of methylenebis-(triphenylphosphonium bromide) prepared as described above is stirred in 400 ml. dry ether, at 0° C. under nitrogen, while 60 ml. lithium butyl in hexane (0.1 mole lithium butyl) is added slowly.

The product is a slurry of triphenyl[(triphenylphosphoranylidene)methyl]phosphonium bromide (methylidyne bis(triphenylphosphoranium)bromide), a white insoluble powder, in a yellow solution of carbobis(triphenylphosphorane).

The mesomeric phosphorus salt halide is isolated, using methylene dichloride, methanol and ethyl acetate as recrystallization solvents. It analyzes correctly for methylidyne bis(triphenylphosphoranium) bromide,

$$HC[(C_6H_5)_3P]_2Br$$

or

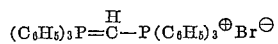

$$(C_6H_5)_3P=\overset{H}{C}-P(C_6H_5)_3{}^{\oplus}Br{}^{\ominus}$$

triphenyl[(triphenylphosphoranylidene)methyl] phosphonium bromide).

Calc.: 72.0% C; 5.29% H; 10.00% P; 13.0% Br (ionic). Found: 72.9% C; 5.0% H; 9.77% P; 12.70% total Br, 12.59% ionic Br.

The infrared ultraviolet and nuclear magnetic resonance spectra corroborate the identification.

Concentration of the solution under anhydrous conditions yields the carbobis(triphenylphosphorane), melting at above about 200° C. after recrystallization.

EXAMPLE 2

This example also illustrates preparation of a mesomeric outer salt.

A mixture of 17.5 g. (0.025 mole) of methylene bis-(triphenylphosphonium bromide) in 400 ml. of dry ether is stirred under nitrogen at 0° C. while 15 ml. (0.025 mole) of a solution of lithium butyl in hexane is added over a period of 15 minutes, with stirring. After addition is complete, stirring of the buff-white slurry under nitrogen is continued for further two hours. Filtering separates 17 g. of a white solid, which is extracted with a mixture of methylene dichloride and water. The methylene dichloride layer is washed 3 times with 300 ml. each time of water and dried over methyl sulfate. The dried solution, after filtration, is evaporated to dryness, producing 13 g. of white solid which is recrystallized twice from methylene dichloride and ethyl acetate, to give 10 g. of methylidyne bis(triphenylphosphoranium) bromide, identified by the infrared spectrum.

EXAMPLE 3

The procedure of Example 2 is repeated, but using 30 ml. of the solution of lithium butyl and hexane (0.050 mole). The resulting reaction mixture is a bright yellow slurry of methylidyne bis(triphenylphosphoranium)bromide in a solution of carbobis(triphenylphosphorane).

EXAMPLE 4

This example illustrates the preparation of a methylidyne bis(phosphoranium) salt by treatment of a methylene bis(phosphonium) salt with sodium carbonate as the base.

The mixture of a solution of 10 g. of sodium carbonate in 50 ml. of water with 2 g. of methylene bis(triphenylphosphonium bromide) is refluxed. The reaction mixture is filtered to separate buff-white crystals of methylidyne bis(triphenylphosphoranium)bromide, dried at 120° C./1 mm., identified by infrared spectrum.

EXAMPLE 5

This example illustrates another preparation of the phosphoranium salt using sodium carbonate.

A mixture of 7 g. of methylene bis(triphenylphosphoniumbromide) (0.01 mole) and 11 g. of sodium carbonate (0.1 mole) in 250 ml. of water is refluxed under nitrogen with stirring for 1½ hours. A white solid is separated by filtration of the white reaction mixture slurry. This is recrystallized from 15 ml. of a mixture of methanol and ethyl acetate, to provide methylidyne bis(triphenylphosphoranium)bromide.

EXAMPLE 6

A mixture of 70 g. (0.1 mole) of methylene bis(triphenylphosphonium bromide) and a solution of 60 g. (0.5 mole) of sodium carbonate in 500 ml. of water is refluxed under nitrogen for 4 hours, to provide a reaction mixture which is a white slurry. The white slurry is filtered to give white crystals which are washed with water and air dried, followed by drying at 120° C./1 mm. The white crystals are recrystallized from 120 ml. of warm methanol and 800 ml. of ethyl acetate, added slowly with stirring, and washed with cold ethyl acetate to give fine white crystals of methylidyne bis(triphenylphosphoranium)bromide. This product is recrystallized from 50 ml. of warm methanol plus 300 ml. of ethyl acetate.

Calc.: 72.0% C; 5.29% H; 10.00% P; 13.0% Br (ionic). Found: 71.85% C; 5.18% H; 10.10% P; 13.16% total Br, 13.17% ionic Br.

EXAMPLE 7

This example illustrates the use of dimethylformamide as a base for removal of the elements of hydrogen halide from the phosphonium salt.

Three g. of methylene bis(triphenylphosphonium bromide) is heated in 100 ml. of pure dry dimethylformamide under nitrogen at 120–140° C. for about 24 hours with stirring. This produces a pale yellow solution from which, after evaporation, lemon yellow crystals can be separated by filtration. These crystals comprise methylidyne bis(triphenylphosphoranium)bromide, identified by infrared spectrum.

EXAMPLE 8

This example illustrates another use of dimethylformamide as a base.

21 g. (0.03 mole) of methylene bis(triphenylphosphonium bromide) in pure dry dimethylformamide is heated to about 100° C. under nitrogen for 4 hours, let stand overnight, reheated to 100° C. and held at this temperature for a further 4 hours, let stand overnight and heated to 110° C. for 3 more hours, under nitrogen, with stirring. The reaction mixture is now evaporated and 300 ml. of ether is added to the resulting liquid, slowly with stirring, to give a dense white precipitate. The white precipitate is washed with ether and recrystallized from warm methanol (30 ml.) and ethyl acetate (300 ml.) to give a product which is identified as identical with methylidyne bis(triphenylphosphoranium)bromide.

EXAMPLE 9

This example illustrates the metathesis of a methylidyne bis(phosphoranium) halide.

Methylidyne bis(triphenylphosphoranium) bromide is prepared by treatment of methylenebis(triphenylphosphonium bromide) with sodium carbonate as described in Example 6. A solution of 3.2 g. of sodium tetraphenylboronate (0.01 mole) in 50 ml. of water is added slowly with stirring to 6.2 g. of the methylidyne bis(triphenylphosphoranium) bromide (0.01 mole) in 500 ml. of warm water with stirring to give a viscous colloidal white precipitate. Now, 500 ml. of acetone is added, with stirring, and the reaction mixture is filtered to remove a white solid. The acetone/water filtrate is treated with 1000 ml. of water to produce slow precipitation of fine white crystals which are filtered off and washed with water and then recrystallized from 120 ml. of warm acetone and 400 ml. of ether. The recrystallized product is washed with ether to recover fine white crystals of methylidyne bis(triphenylphosphoranium)tetraphenylboronate. After a further recrystallization from 50 ml. of warm acetone and 600 ml. of ethyl acetate, the methylidyne bis(triphenylphosphoranium)tetraphenylboronate melts at 197–199° C., and has an elemental analysis and infrared spectrum corroborating the postulated structure.

When a sample of this salt is exposed to light, it changes from white to orange in color. The white salt does not contain free redicals, but electron spin resonance shows that the orange product of exposure to light does contain free radicals.

EXAMPLE 10

A mixture of 29 g. (0.042 mole) methylenebis(triphenylphosphonium bromide) and 10 g. (0.012 mole) of triphenylboron is stirred under nitrogen in 500 ml. dry ether at 0° C. while 50 ml. of a solution of lithium butyl (0.084 mole) in hexane is added over a period of 40 minutes. The reaction mixture is refluxed gently under nitrogen for an hour and the solids are filtered off and extracted with 200 ml. methylene dichloride and 400 ml. water.

The methylene dichloride layer is washed twice with 300 ml. of water each time, dried and evaporated, to give a buff-white solid which is recrystallized from 50 ml. of hot methylene dichloride and 400 ml. ethyl acetate to produce crystals which are then again recrystallized, using 30 ml. hot methylene dichloride and 400 ml. ethyl acetate, and then dried at 200 mm./80° C. There are obtained 13.5 g. of white crystals, M. 170–172° C., which are now recrystallized from methanol and then again recrystallized from methylene dichloride and ethyl acetate. This product is methylidyne bis(triphenylphosphoranium) butyltriphenylboronate. It is only slightly soluble in methanol, whereas the corresponding bromide is very soluble in methanol.

Calc.: 84.7% C; 6.6% H; 7.4% P; 1.3% B (0% Br). Found: 85.62% C; 6.69% H; 7.61% P; 1.08%, 0.94% B, 0% Br.

EXAMPLE 11

Triphenylphosphonium methylenetriphenylphosphorane bromide is prepared by dehydrohalogenating methylene bis(triphenylphosphonium bromide) as follows:

A mixture of 17.5 grams (g.) (0.025 mole) of methylene bis(triphenylphosphonium bromide) in 400 milliliters (ml.) of dry ether is stirred under nitrogen at 0° C. while 15 ml. (0.025 mole) of a solution of lithium butyl in hexane is added over a period of 15 minutes, with stirring. After addition is complete, stirring of the buff-white slurry under nitrogen is continued for a further 2 hours. Filtering separates 17 g. of a white solid, which is extracted with a mixture of methylene dichloride and water. The methylene dichloride layer is washed 3 times with 300 ml. each time of water and dried over magnesium sulfate. The dried solution, after filtration, is evaporated to dryness, producing 13 g. of white solid which is methylidyne bis(triphenylphosphoranium)bromide (triphenyl [(triphenylphosphoranylidene)methyl] phosphonium bromide).

For the preparation of hexaphenylcarbodiphosphorane, 1 g. of potassium, cut into small pieces, is placed in 100 ml. of dry diglyme (the dimthyl ether of diethylene glycol). The diglyme is heated to reflux and then 12.4 g. of the [(triphenylphosphoranylidene)methyl]phosphonium bromide is introduced. The reaction mixture is refluxed for 2 hours and then filtered, in a dry box.

Similar procedures can be employed to prepare solutions of other hexahydrocarbyl carbodiphosphoranes, analogously.

EXAMPLE 12

This example describes the preparation of triphenylphosphonium methylenetriphenylphosphorane inner salt with an anionic group comprising a Group III element trisubstituted by hydrocarbon radicals.

Twenty ml. of the filtrate provided as described in Example 11 is mixed with 20 ml. of a freshly prepared solution of triphenylboron in dry diglyme, containing 0.05 g. of triphenylboron per ml. of solution. After standing overnight, the mixture is heated in an oil bath at 140° C. for 2 hours and then raised to the reflux temperature of diglyme (162° C.) for 2 hours. The reaction mixture, which is now a dark brown solution, is cooled to room temperature and the solvent diglyme is removed at 50° C./0.1 mm. To the residual syrup is added 5.0 ml. of methanol. This produces a light tan solid precipitate which is filtered off and dried in vacuum. The precipitated product is triphenylphosphonium(triphenylboronyl)methylenetriphenylphosphorane.

On exposure to ultraviolet light, the light tan solid turns yellow colored in one to two minutes.

EXAMPLE 13

This example describes another preparation of the triphenylboronyl inner salt prepared in Example 12.

Hexaphenylcarbodiphosphorane is prepared as described in Example 11. The resulting reaction product contains about 0.1 g. hexaphenylcarbodiphosphorane per ml. of solution.

A 45–50 ml. portion of this hexaphenylcarbodiphosphorane solution is heated to 140° C. and then 45 ml. of a solution of triphenylboron in diglyme (0.05 g./ml.) is added at a rate of 1 drop per 3 seconds. After 15 minutes, the temperature of the reaction mixture is raised to reflux while the addition continues. The addition is complete after 35 minutes. Reflux is continued for 4 hours. The solvent is removed as in the preceding example, and 10 ml. of methanol are added to the remaining viscous reaction product. This produces a tan solid which is dried at room temperature (0.1 mm. Hg). The melting point of the resulting product is 235–240° C.

EXAMPLE 14

This example describes another preparation of the triphenylboronyl inner salt.

Addition of 7.5 g. of triphenylboron in 150 ml. of dry diglyme to 150 ml. of a refluxing solution of hexaphenylcarbodiphosphorane in diglyme is followed by refluxing for 4.5 hours. Solvent is removed at 55° C./0.5 mm. and 5 ml. of methanol are added to precipitate a buff solid. This is filtered off and extracted with 25 ml. of boiling diethyl ether for ½ hour to remove unreacted triphenyl boron.

To purify the product, the buff solid reaction product (M. 232–236°) is refluxed with charcoal and methylene dichloride, and then precipitated out with ethyl acetate. The purified product melts at 244–246° C.

Elemental analysis and molecular weight (determined thermally in methylene dibromide) conform to the calculated values.

On irradiation of the analytical sample with an ultraviolet lamp, the color deepens progressively, over a 1 hour period, from off-white to dark yellow. Exposed to sunlight through glass, it changes to light yellow in three hours.

EXAMPLE 15

This example describes preparation of a dimesomeric inner salt.

A solution of hexaphenylcarbodiphosphorane is prepared as described in Example 14, and recovered as the filtrate from reaction of potassium in diglyme solution with [(triphenylphosphoranylidene)methyl]phosphonium bromide. A 50 ml. portion of the filtrate is maintained at 100° C. while carbon dioxide is bubbled through it for about an hour and a half, to provide triphenylphosphonium(carboxy)methylenetriphenylphosphorane, as a white solid.

While the invention has been described with particular reference to various specific preferred embodiments thereof, it is to be appreciated that modifications and variations can be made without departing from the scope of the invention which is limited only as defined in the following claims.

What is claimed is:

1. Compounds wherein a single carbon atom links two phosphorus atoms, each having three substituents in addition to said single linking C atom, said phosphorus substituents consisting of hydrocarbon radicals free of non-benzenoid unsaturation and containing from 1 to 18 carbon atoms, said compounds being selected from the class consisting of (1) carbodiphosphoranes wherein said single C atom linking said two phosphorus atoms is unsubstituted; (2) outer salts having a cation comprising a monovalent mesomeric system wherein said C atom carries a substituent selected from the group consisting of H and hydrocarbon radicals free of non-benzenoid unsaturation and containing from 1 to 18 carbon atoms; and (3) trisubstituted phosphonium methylene trisubstituted phosphorane inner salts with mesomeric cations wherein said C atom carries a substituent selected from the class consisting of trisubstituted Group III element anionic groups of the formula

where M is a Group III element and each of $R_1'$, $R_2'$ and $R_3'$ is a hydrocarbon radical free of nonbenzenoid unsaturation and containing up to 12 C atoms and anionic groups of the formula

where Y and Z are chalcogen elements.

2. The method of forming a mesomeric salt of the formula $$CH[P(C_6H_5)_3]_2{}^+Br^-$$

and a carbodiphosphorane of the formula $$(C_6H_5)_3P=C=P(C_6H_5)_3$$

which comprises contacting methylenebis(triphenylphosphonium bromide) with an amount of lithium butyl which is greater than a molar equivalent of said methylenebis(phosphonium bromide).

3. A salt of the formula $$CH[P(C_6H_5)_3]_2{}^+Br^-$$

4. A salt of the formula $$CH[P(C_6H_5)_3]_2{}^+[B(C_6H_5)_4]^-$$

5. A carbodiphosphorane of the formula $$(C_6H_5)_3P=C=P(C_6H_5)_3$$

6. Salts wherein the cation is a monovalent mesomeric system comprising a methylidyne radical linking two phosphorus atoms each having 3 substituents in addition to the single linking C atom of said methylidyne radical, wherein the substituents of said methylidyne radical are selected from the group consisting of H and hydrocarbon radicals free of nonbenzenoid unsaturation and containing from 1 to 18 C atoms, and the substituents of said phosphorus atoms are hydrocarbon radicals free of nonbenzenoid unsaturation and containing from 1 to 18 C atoms.

7. The salts of claim 6 wherein each P atom is substituted by three aryl radicals.

8. The salts of claim 6 wherein the anion is a halide

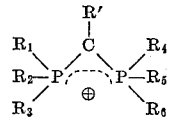

in which each of $R_1$, $R_2$, $R_3$, $R_4$, $R_5$ and $R_6$ is a hydrocarbon radical free of nonbenzenoid unsaturation and containing up to 18 C atoms, and R' is selected from the class consisting of H and a hydrocarbon radical free of nonbenzenoid unsaturation and containing up to 18 C atoms.

9. Carbodiphosphoranes wherein a single, unsubstituted C atom links two phosphorus atoms each having three substituents in addition to said single linking C atom, said substituents consisting of hydrocarbon radicals free of non-benzenoid unsaturation and containing from 1 to 18 carbon atoms of the formula

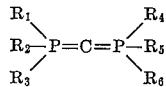

wherein each of $R_1$, $R_2$, $R_3$, $R_4$, $R_5$ and $R_6$ is a hydrocarbon radical free of nonbenzenoid unsaturation and containing from 1 to 18 C atoms.

10. A carbobis(triarylphosphorane) as defined in claim 9, wherein the said hydocarbon radicals are aryl radicals.

11. Trisubstituted phosphonium methylene trisubstituted phosphorane inner salts with trisubstituted Group III element anionic group radicals attached to the C atom of said methylene group, of the formula

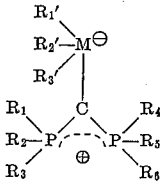

wherein each of $R_1$, $R_2$, $R_3$, $R_4$, $R_5$ and $R_6$ is hydrocarbon free of nonbenzenoid unsaturation and containing up to 18 C atoms, M is a Group III element, and each of $R_1'$, $R_2'$, and $R_3'$ is a hydrocarbon radical of up to 12 C atoms.

12. The inner salt of a trihydrocarbyl phosphonium methylene trihydrocarbyl phosphorane with an anionic group consisting of a carbon atom having 2 substituents each of which is a chalcogen element, of the formula

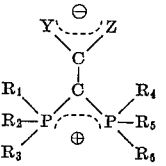

wherein each of $R_1$, $R_2$, $R_3$, $R_4$, $R_5$ and $R_6$ is a hydrocarbon radical free of nonbenzenoid unsaturation and containing up to 18 C atoms, and each of Y and Z is a chalcogen element.

13. Triphenylphosphonium (triphenylboronyl) methylenetriphenylphosphorane of the formula

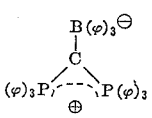

wherein $\varphi$ represents a phenyl radical

14. Triphenylphosphonium(carboxy)methylenetriphenylphosphorane of the formula

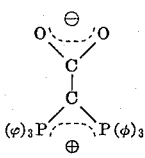

wherein each φ represents a phenyl radical.

15. The method of providing an inner salt which comprises contacting a carbodiphosphorane with a molecular anion precursor selected from the class consisting of trisubstituted Group III element anions of the formula

wherein M is a Group III element and each of $R_1'$, $R_2'$ and $R_3'$ is a hydrocarbon radical free of nonbenzenoid unsaturation and containing up to 12 C atoms, and anionic groups of the formula

wherein Y and Z are chalcogen elements.

16. The method of providing an inner salt which comprises contacting a carbodiphosphorane with a trisubstituted Group III element of the formula

wherein M is a Group III element and each of $R_1'$, $R_2'$, and $R_3'$ is a hydrocarbon radical free of nonbenzenoid unsaturation and containing up to 12 C atoms.

17. The method of providing an inner salt which comprises contacting a carbodiphosphorane with an unsaturated carbon compound of the formula

wherein Y and Z are chalcogens.

18. The method of forming a mesomeric salt which comprises contacting a base with a methylene bisphosphonium salt in which the substituents on the phosphorus atoms are hydrocarbon radicals free of non-benzenoid unsaturation and containing from 1 to 18 C atoms, wherein the compound formed by combination of the anion of said salt and the methylene C atom substituent is a volatile inorganic compound.

19. The method of claim 18 wherein said salt is a bis(phosphonium halide).

20. The method of claim 19 wherein said base is an alkali metal carbonate.

21. The method of claim 19 wherein said base is dimethylformamide.

22. The method of forming an allene analog which comprises contacting a mesomeric salt as defined in claim 6, wherein the methylidyne C atom substituent and the anion of said salt combine to form a volatile inorganic compound, with a metallic base in a non-aqueous system.

23. Inner salts wherein the group comprising the cation of the inner salt is a trisubstituted phosphonium methylene trisubstituted phosphorane group wherein the substituents of said phosphonium and said phosphorane group P atoms are each hydrocarbon radicals free of nonbenzenoid unsaturation and containing from 1 to 18 C atoms.

References Cited by the Examiner

UNITED STATES PATENTS 2,912,467  11/1959  Gerecke et al. _____ 260—606.5

OTHER REFERENCES

Ger. application No. T 7,628, publ. October 1955.
Ramirez et al.: J.A.C.S., vol. 83, pages 3539–3540, 1961.

LORRAINE A. WEINBERGER, *Primary Examiner.*

T. L. GALLOWAY, *Assistant Examiner.*